United States Patent [19]

Harris

[11] Patent Number: 4,776,267

[45] Date of Patent: Oct. 11, 1988

[54] APPARATUS FOR IRRADIATING FOODSTUFFS WITH ULTRAVIOLET RAYS

[76] Inventor: James I. Harris, #C293, 1401 Lakewood Ave., Modesto, Calif. 95355

[21] Appl. No.: 30,660

[22] Filed: Mar. 25, 1987

[51] Int. Cl.⁴ .......................... A23L 3/26; F26B 23/08
[52] U.S. Cl. .............................. 99/451; 34/1; 99/477; 99/485; 219/10.55 R; 426/242
[58] Field of Search ............... 99/451, 485, 467, 474, 99/470, 483, 477; 366/111, 114, 313, 273, 237; 422/121; 426/418, 235, 241, 242, 251; 219/339, 342, 345, 350, 10.55 R, 10.55 A; 34/1, 54, 68

[56] References Cited

U.S. PATENT DOCUMENTS

| | | | |
|---|---|---|---|
| 2,756,973 | 7/1956 | Dostatni | 366/114 X |
| 3,295,667 | 1/1967 | Kittle | 366/111 X |
| 3,910,176 | 10/1975 | Burrows | 99/477 |
| 4,061,788 | 12/1977 | Wommack | 99/451 |
| 4,421,015 | 12/1983 | Masters et al. | 99/339 |
| 4,570,045 | 2/1986 | Jeppson | 99/451 |
| 4,687,895 | 8/1987 | Chitre et al. | 219/10.55 A |

Primary Examiner—Timothy F. Simone
Attorney, Agent, or Firm—Townsend and Townsend

[57] ABSTRACT

An apparatus for irradiating a foodstuff with ultraviolet energy comprising a transport unit for receiving foodstuff at a first location and for transporting the foodstuff in a relatively spread out condition along a path to a second location. The foodstuff passes through a substantially enclosed housing wherein the foodstuff is exposed to a flux of ultraviolet radiation from a plurality of germicidal lamps. The transport unit includes a shaker table within the housing sloping downwardly from the entrance opening of the housing for agitating the foodstuff so that the foodstuff turns over and exposes its entire surface to the flux of radiation as it travels through the housing.

21 Claims, 2 Drawing Sheets

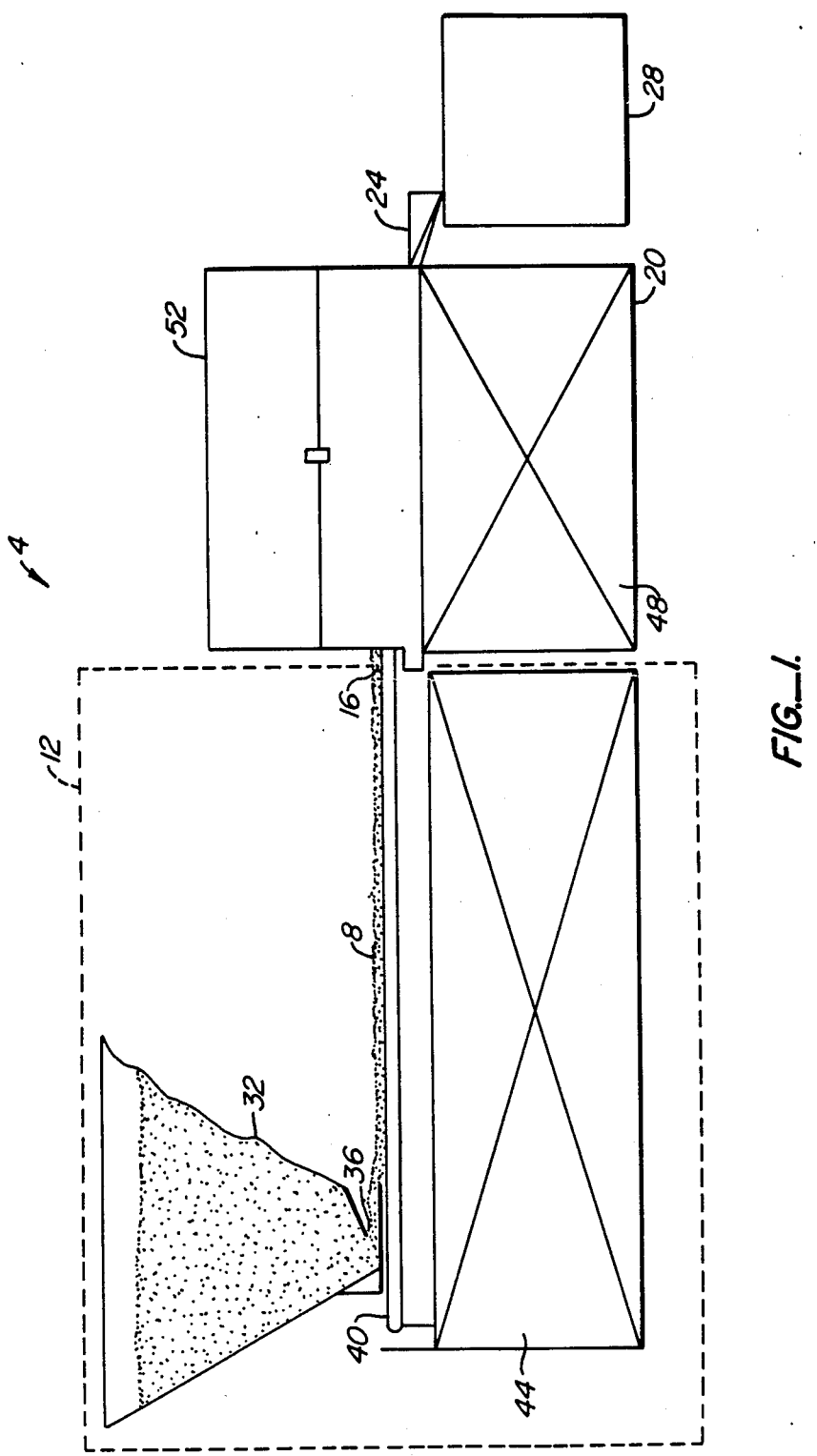
FIG._1.

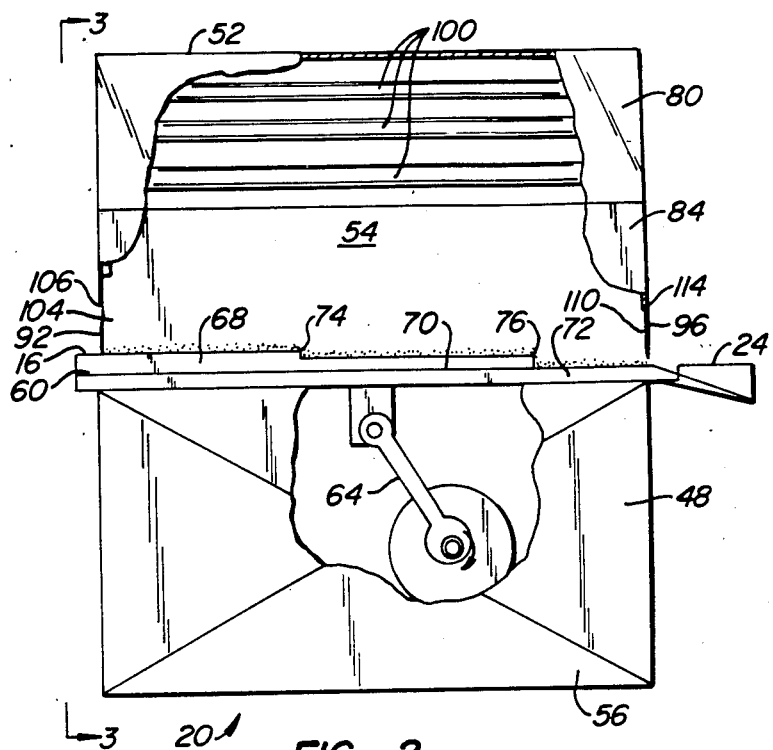
FIG._2.
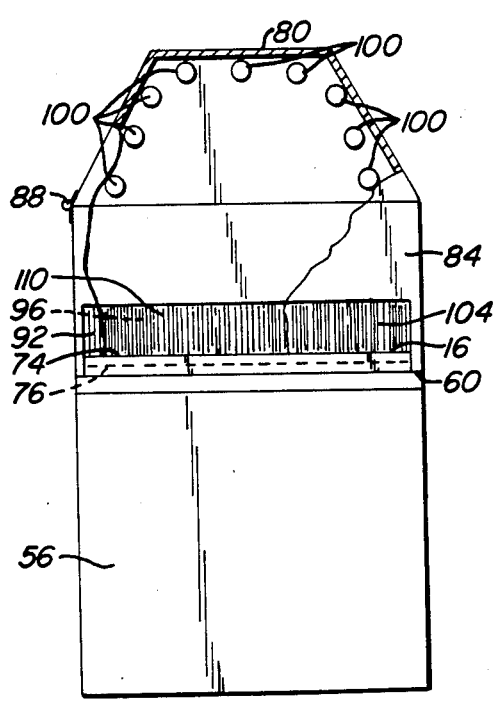
FIG._3.

APPARATUS FOR IRRADIATING FOODSTUFFS WITH ULTRAVIOLET RAYS

BACKGROUND OF THE INVENTION

1. Field of the Invention

This invention relates to food processing devices and, more particularly, to a device for irradiating foodstuffs with ultraviolet rays for the destruction of bacteria and other microorganisms disposed on the foodstuff.

2. Description of the Relevant Art

It is well known that microorganisms, particularly yeast, mold spores, fungi, and the egg and/or larva of insects, exist on the surface of foodstuffs prior to packaging, and that these microorganisms must be eliminated to avoid spoilage of the foodstuffs or maturing of the insects. This is particularly true with respect to dry foodstuffs, such as nuts and grains.

In conventional sterilization techniques, the foodstuff is bathed in an atmosphere or solution of chemicals that are toxic to the microorganisms, in hopes of eradicating the microorganisms and hence making the product durable and free from insect life. However, the chemicals used may leave a residue, which is ingested by the consumer, and the chemical treatments are not always effective in view of the numerous instances of live or dead insects and mold still encountered in packaged products.

It is well known that ultraviolet radiation, particularly ultraviolet radiation having a wavelength of approximately 260 nm, kills microorganisms and helps in keeping them under control to avoid spoilage of foodstuffs. One method of sterilizing foodstuffs which utilizes this fact includes irradiating air flowing through heat and air conditioning ducts in order to kill floating or suspended bacteria, and directly irradiating air in occupied areas. Another method involves direct irradiation of the product to be protected. This is accomplished by placing a source of ultraviolet radiation into storage coolers and holding rooms, such as meat lockers. Although effective, the ultraviolet radiation poses a health risk to personnel, and hence cannot be used safely in areas where the food process must be manually controlled.

Finally, many mechanisms have been devised which use ultraviolet radiation for the protection of foods, pharmaceuticals, and other products affected by microorganisms. For example, U.S. Pat. No. 2,364,049, issued to D. Bensel, discloses a process for preserving fresh vegetables wherein the vegetables are transported on a conveyor belt and the conveyor belt passes through a surrounding plurality of ultraviolet lamps. Another technique for irradiating foodstuffs is exemplified by U.S. Pat. No. 1,817,936, issued to G. C. Supplee, which discloses an apparatus for irradiating powdered milk solids as the milk solids are transported through a trough and feed screw device or poured through a vertical conduit.

SUMMARY OF THE INVENTION

The present invention is directed to an apparatus for irradiating a foodstuff completely with ultraviolet energy. The apparatus is particularly well suited for irradiating dry foodstuff, such as nuts and grains, after the foodstuff is sized and before it is stored, prior to packaging and other processing, or immediately prior to shipping. In one embodiment of the invention, a transport unit receives a dry foodstuff at a first location in a relatively spread out condition and transports the foodstuff along a path to a second location. The foodstuff passes through a substantially enclosed housing wherein the foodstuff is exposed to a flux of ultraviolet radiation from a plurality of germicidal lamps. To ensure irradiation of all particles over their entire surface, the transport unit includes a shaker table sloping downwardly from the entrance opening of the housing for agitating the foodstuff so that all foodstuff particles and the entire surface of each particle is exposed to the flux of radiation as it travels through the housing. The shaker table may be used to vary the rate of flow of foodstuff through the housing, and the agitation of the foodstuff particles allows the product to be irradiated with only an overhead source of radiation, which simplifies the design of the machine. After the foodstuff is sufficiently irradiated, the transport unit discharges the foodstuff to an output receptacle.

Foodstuff processed according to the present invention is disinfected and chemical free, and it is thus a healthier and safer product for human consumption. The substantially enclosed housing contains the ultraviolet radiation within the processing unit, so the processing unit readily meets OSHA requirements for personnel working in the vicinity of the unit. By eliminating the need for chemical treatment, processing speed is significantly enhanced, and it is much easier to meet deadlines or emergency orders.

BRIEF DESCRIPTION OF THE DRAWINGS

FIG. 1 is a side view of an apparatus according to the present invention for irradiating foodstuff with ultraviolet energy.

FIG. 2 is a partly broken away side view of the transport unit of FIG. 1.

FIG. 3 is a view taken along line 3—3 of FIG. 2.

DETAILED DESCRIPTION OF THE PREFERRED EMBODIMENTS

FIG. 1 is a side view of an apparatus 4 for irradiating foodstuffs 8 with ultraviolet energy. Apparatus 4 comprises a foodstuff input unit 12 for depositing the foodstuff 8 at a first location 16, a transport unit 20 for transporting the foodstuff 8 over a path from first location 16 to a second location 24 and for irradiating the foodstuffs with ultraviolet energy, and a foodstuff output unit 28 for receiving foodstuff 8 after the foodstuff emerges from second location 24.

Foodstuff input unit 12 comprises a storage hopper 32 having a discharge opening 36 through which the foodstuff can flow at a generally constant volumetric rate. Disposed near discharge opening 36 is a conveyor belt 40 disposed on a base 44 for depositing the foodstuff at first location 16 in a relatively spreadout condition. Conveyor belt 40 may be driven by any suitable drive means (not shown) of well known construction.

As shown in FIGS. 2 and 3. transport unit 20 comprises a shaker table 48 and a stationary housing 52 forming an irradiation chamber 54. Shaker table 48 agitates the foodstuff 8 as foodstuff 8 is transported from first location 16 to second location 24. Shaker table 48 comprises a stationary shaker base 56 and a shaker platform 60. with platform 60 preferably extending the full length of chamber 54. Shaker platform 60 and the walls of chamber 54 preferably are constructed of material having high reflective properties and provide for strength, durability, cleanliness, and ease of maintenance such as stainless steel. Suggested reflective materials are enhanced aluminum, magnesium oxide calcium carbonate, alzak aluminum, aluminum paint, etc. Shaker platform 60 preferably is driven in an oscillating back-and-forth manner i.e., in a horizontal plane by a variable speed driving unit 64 of well known construction. Shaker platform 60 preferably is formed thirty inches wide and has downwardly stepped surfaces 68, 70, and 72 forming free-fall levels 74 and 76 for reasons discussed below.

Housing 52 overlies shaker table 48 and comprises a hood 80 disposed on top of a wall 84 and pivotally connected to wall 84 along one side through a hinge 88 to facilitate cleaning and maintenance. Hood 80 preferably is secured to wall 84 at the side opposite hinge 88 through a lock or latch (not shown). Housing 52 includes an entrance opening 92 near first location 16 and an exit opening 96 near second location 24. Each entrance opening 92 and exit opening 96 is sized approximately three inches high to accommodate the flow of foodstuff 8 therethrough with relatively little clearance. Disposed lengthwise within hood 80, preferably parallel to the flow of product are a plurality of 36-inch. 30-watt medium bipin germicidal ultraviolet lamps 100 for subjecting foodstuff 8 to a flux of ultraviolet radiation as it travels from first location 16 to second location 24. Lamps 100 emit ultraviolet radiation at a wavelength from approximately 220 nm to approximately 300 nm, preferably approximately 260 nm, and they are readily available from General Electric Corp. of Cleveland, Ohio.

Housing 52 substantially covers shaker table 48 for containing the ultraviolet radiation in the vicinity of foodstuff 8 as it travels from entrance opening 92 to exit opening 96. Additionally, lamps 100 are supported by hood 80 at a sufficient height relative to entrance opening 92 and exit opening 96 so that the light from lamps 100 is substantially contained within housing 52. To further enhance containment of the ultraviolet radiation, entrance opening 92 has a curtain 104 connected to an upper border 106 thereof. Exit opening 96 has a similar curtain 110 connected to an upper border 114 thereof. Curtains 104 and 110 preferably are flexible and lightweight filament curtains constructed of a material capable of reflecting ultraviolet rays for providing an additional safety factor to protect the eyes and skin of personnel in the area of the rays. Such material is commonly available and known commercially as "Vinylite" Curtains 104 and 110 thus minimize the leakage of ultraviolet radiation from housing 52, but they allow foodstuff 8 to pass into and out from transport unit 20 with minimum obstruction.

In operation, the foodstuff 8 in storage hopper 32 is emitted from discharge opening 36 at a generally constant volumetric rate, and conveyor belt 40 conveys foodstuff 8 toward first location 16 and entrance opening 92 in a relatively spread out condition. Foodstuff 8 then passes through curtain 104 at entrance opening 92 and onto surface 68, wherein foodstuff 8 is subjected to the flux of ultraviolet radiation from lamps 100 and the oscillating motion of shaker platform 60. Shaker platform 60 agitates the product to ensure a shallow and consistent level of product, and it moves the product along the path from entrance opening 92 to exit opening 96 in a gentle fashion and turns the product over by the way of the agitation and the two free-fall levels 74 and 76. By turning the product over, the full product surface is exposed to the short wavelength germicidal ultraviolet rays. When foodstuff 8 reaches exit opening 96, it passes through curtain 110 and is deposited in foodstuff output unit 28.

While the above is a complete description of a preferred embodiment of the present invention, various modifications are obvious to those of ordinary skill in the art. For example, shaker platform 60 may be any downwardly sloping surface which, in turn, may be connected to a suitable agitating apparatus for transporting foodstuffs from entrance opening 92 to exit opening 96. The configuration of hood 80 may vary, and the number and arrangement of lamps 100 likewise may vary. The sizes of entrance opening 92 and exit opening 96 may vary according to the requirements of the product, and curtains 104 and 110 may be omitted or be formed as a single continuous sheet as desired. Consequently, the description should not be used to limit the scope of the invention which is properly described in the claims.

What is claimed is:

1. Apparatus for processing a dry foodstuff comprising:
   means for depositing the foodstuff at a first location;
   means for transporting the foodstuff over a path from said first location to a second location;
   means for subjecting the foodstuff to a flux of ultraviolet radiation as it travels along said path;
   means for agitating the foodstuff for exposing surfaces of said foodstuff to the flux of ultraviolet radiation as the foodstuff travels along said path; and
   means for containing said ultraviolet radiation in the vicinity of said foodstuff as said foodstuff travels along said path.

2. The apparatus of claim 1 wherein said means for depositing comprises:
   a storage hopper having a discharge opening through which the foodstuff can flow at a generally constant volumetric rate; and
   a conveyor belt for presenting the foodstuff at said first location in a relatively spread out condition.

3. The apparatus of claim 1 wherein said means for transporting and said means for agitating together comprise:
   a shaker table having a continuous surface, the shaker table sloping downwardly from said first location to said second location.

4. The apparatus of claim 3 further comprising means for turning said foodstuff over as said foodstuff travels along said path.

5. The apparatus of claim 4 wherein said turning means comprises a series of stepped horizontal surfaces formed in said shaker table.

6. The apparatus of claim 5 further comprising means for driving said shaker table in an oscillating manner.

7. The apparatus of claim 1, wherein said means for subjecting comprises:
   a plurality of germicidial ultraviolet lamps disposed along said path.

8. The apparatus of claim 1 wherein said means for containing comprises
   a housing overlying said path, the housing having an entrance opening at said first location and an exit opening at said second location, each of said entrance and exit openings being sized to accommodate the flow of foodstuff therethrough with relatively little clearance.

9. The apparatus of claim 8, further comprising:

a curtain disposed at each of said entrance and exit openings, each curtain being sized to substantially cover said entrance and exit openings and to accommodate the flow of foodstuff therethrough with relatively little clearance.

10. Apparatus for processing a dry foodstuff comprising:
a storage hopper having a discharge opening through which the foodstuff can flow at a generally constant volumetric rate;
a conveyor belt for receiving the foodstuff from said discharge opening and presenting the foodstuff at a first location in a relatively spread out condition;
a shaker table having a continuous surface sloping downwardly from said first location to a second location so that the foodstuff is transported along a path from said first location to said second location;
means for oscillating the shaker table in a horizontal plane for turning the foodstuff over to completely expose the surface of the foodstuff as the foodstuff travels along said path;
a plurality of germicidal ultraviolet lamps disposed along said path; and
a housing overlying said path and supporting said lamps therein, said housing having an entrance opening at said first location and an exit opening at said second location, each of said entrance and exit openings being sized to accommodate the flow of foodstuff with relatively little clearance, said housing supporting said lamps at a sufficient height realtive to said entrance and exit openings so that the light from said lamps is substantially contained within said housing.

11. The apparatus of claim 10, and further comprising a receptacle for receiving the foodstuff after the foodstuff emerges from said exit opening.

12. The apparatus of claim 8 wherein the housing comprises:
a wall encircling said path; and
a hood pivotably connected to the top of the wall so that pivoting the hood relative to the wall exposes the path.

13. The apparatus of claim 12 wherein the plurality of germicidal lamps are disposed in the hood.

14. An apparatus for processing a dry foodstuff comprising:
depositing means for depositing the foodstuff at a first location;
transporting means for transporting the foodstuff over a path from said first location to a second location, said transporting means including surface exposing means for exposing the entire surfaces of the foodstuff as the foodstuff travels along said path;
radiating means for subjecting substantially only the surfaces of the foodstuff to a flux of radiation as the foodstuff travels along said path; and
containing means for containing said radiation in the vicinity of said foodstuff as the foodstuff travels along said path.

15. The apparatus according to claim 14 wherein said radiating means comprises a plurality of germicidal ultraviolet lamps disposed along said path.

16. The apparatus according to claim 15 wherein said transporting means comprises a shaker table sloping downwardly from said first location to said second location.

17. The apparatus according to claim 16 wherein said surface exposing means comprises agitating means coupled to the shaker table for agitating said foodstuff as said foodstuff travels along said path.

18. The apparatus according to claim 17 wherein the shaker table has a downwardly-stepped, continuous surface extending from said first location to said second location.

19. The apparatus according to claim 18 wherein the agitating mans oscillates said shaker table in a horizontal plane so that said foodstuff turns over as said foodstuff travels along said path for exposing the entire surfaces of said foodstuff to a flux of ultraviolet radiation from said radiating means.

20. The apparatus according to claim 19 wherein said containing means comprises a housing overlying said path and supporting said lamps therein, the housing having an entrance opening at said first location and an exit opening at said second location, each of said entrance and exit openings being sized to accommodate the flow of foodstuff with very little clearance, said housing supporting said lamps at a sufficient height relative to said entrance and exit openings so tha the light from said lamps is substantially contained within said housing.

21. The apparatus according to claim 20 wherein the housing comprises:
a wall encircling said path; and
a hood pivotally connected to the top of the wall so that pivoting the hood relative to the wall exposes the path.

* * * * *